(12) United States Patent
Ogle

(10) Patent No.: US 7,008,691 B2
(45) Date of Patent: **\*Mar. 7, 2006**

(54) CONVOLUTED MULTI-LAYER PAD AND PROCESS

(75) Inventor: Steven Eugene Ogle, Murfreesboro, TN (US)

(73) Assignee: L&P Property Management Company, South Gate, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/445,706

(22) Filed: May 27, 2003

(65) Prior Publication Data

US 2003/0235684 A1 Dec. 25, 2003

Related U.S. Application Data

(60) Continuation of application No. 10/068,111, filed on Feb. 6, 2002, now Pat. No. 6,596,387, which is a division of application No. 09/406,366, filed on Sep. 28, 1999, now Pat. No. 6,372,076.

(51) Int. Cl.
*B32B 3/26* (2006.01)
(52) U.S. Cl. .............................. 428/316.6; 428/304.4; 428/158; 428/161; 428/162; 428/182; 442/221; 442/370
(58) Field of Classification Search ............. 428/316.6, 428/304.4, 158, 161, 162, 182; 442/221, 442/370
See application file for complete search history.

(56) References Cited

U.S. PATENT DOCUMENTS

| 1,815,586 A | 7/1931 | Robertson et al. |
|---|---|---|
| 2,689,811 A | 9/1954 | Frederick et al. |
| 2,836,228 A | 5/1958 | Dahle |
| 2,841,205 A | 7/1958 | Bird |
| 2,902,091 A | 9/1959 | Dahle |
| 3,009,848 A | 11/1961 | Simon |
| 3,179,317 A | 4/1965 | Voelker |
| 3,186,271 A | 6/1965 | Kaiser |
| 3,197,357 A | 7/1965 | Schulpen |
| 3,222,697 A | 12/1965 | Scheermesser |
| 3,240,855 A | 3/1966 | Voelker |
| 3,258,791 A | 7/1966 | Kaplan |
| 3,287,196 A | 11/1966 | Koller |

(Continued)

FOREIGN PATENT DOCUMENTS

DE           3818252 A1    5/1988

(Continued)

*Primary Examiner*—Hai Vo
(74) *Attorney, Agent, or Firm*—Conley Rose, P.C.

(57) ABSTRACT

The present invention relates to a process of forming a multi-layer pad of a non-woven fiber batt and a foam layer having conforming convoluted surfaces and to a multi-layer pad incorporating a non-woven fiber batt and foam layer. The process of forming a non-woven batt layer and a foam layer having conforming convoluted surfaces comprises transporting each layer along its longitudinal dimension while compressing each layer along its lateral dimension. Concomitantly with compression, each layer is cut transversely along its lateral dimension to separate each layer into an upper segment and a lower segment and to provide conforming convoluted surfaces on the segments of each layer, the convoluted surfaces comprised of upstanding projections and depressions. The convoluted surfaces of the non-woven batt layer and the foam layer are aligned so that the upstanding projections of the batt convoluted surface project into the corresponding depressions of the foam convoluted surface, while the upstanding projections of the foam convoluted surface project into the corresponding depressions of the batt convoluted surface.

27 Claims, 4 Drawing Sheets

U.S. PATENT DOCUMENTS

| | | | |
|---|---|---|---|
| 3,394,414 | A | 7/1968 | Unger |
| 3,616,029 | A | 10/1971 | Lerman |
| 3,684,140 | A | 8/1972 | Voss |
| 3,738,884 | A | 6/1973 | Soehngen |
| 3,786,701 | A | 1/1974 | Ludwig |
| 3,874,964 | A | 4/1975 | Cogliano et al. |
| 3,906,134 | A * | 9/1975 | Pohl ............................ 428/206 |
| 3,945,627 | A | 3/1976 | Simon |
| 4,064,578 | A | 12/1977 | Yamada |
| 4,111,733 | A | 9/1978 | Periers |
| 4,139,919 | A | 2/1979 | Simon |
| 4,207,636 | A | 6/1980 | Ceriani |
| 4,258,093 | A | 3/1981 | Benedyk |
| 4,401,004 | A | 8/1983 | Glans et al. |
| 4,441,396 | A | 4/1984 | Mercier et al. |
| 4,668,562 | A | 5/1987 | Street |
| 4,673,452 | A | 6/1987 | Awdhan |
| 4,699,032 | A | 10/1987 | Clark, III |
| 4,700,447 | A | 10/1987 | Spann |
| 4,965,901 | A | 10/1990 | Normand |
| 5,022,111 | A | 6/1991 | Fenner, Sr. |
| 5,136,740 | A | 8/1992 | Kraft |
| 5,317,768 | A | 6/1994 | Klancnik |
| 5,340,423 | A | 8/1994 | Jacaruso et al. |
| 5,418,989 | A | 5/1995 | Roe |
| 5,477,573 | A | 12/1995 | Bonaddio et al. |
| 5,488,746 | A | 2/1996 | Hudson |
| 5,490,890 | A | 2/1996 | Morrison |
| 5,534,208 | A | 7/1996 | Barr et al. |
| 5,636,397 | A * | 6/1997 | Boyd et al. .................... 5/739 |
| 5,688,538 | A | 11/1997 | Barr et al. |
| 5,702,801 | A | 12/1997 | Chien |
| 5,707,906 | A | 1/1998 | Eschenbach |
| 5,974,609 | A | 11/1999 | Nunez et al. |
| 5,987,668 | A | 11/1999 | Ackley |
| 6,372,076 | B1 | 4/2002 | Ogle |
| D467,118 | S | 12/2002 | McClure et al. |
| 6,500,292 | B1 | 12/2002 | Mossbeck et al. |
| 6,596,387 | B1 | 7/2003 | Ogle |
| 2002/0114918 | A1 | 8/2002 | Mossbeck et al. |

FOREIGN PATENT DOCUMENTS

| | | |
|---|---|---|
| JP | 89-06711/09 | 3/1980 |

* cited by examiner

CONVOLUTED MULTI-LAYER PAD AND PROCESS

This application is a continuation application of U.S. patent application Ser. No. 10/068,111, filed Feb. 6, 2002, now U.S. Pat. No. 6,596,387, which was a divisional application of U.S. patent application Ser. No. 09/406,366, filed Sep. 28, 1999, now U.S. Pat. No. 6,372,076, both of which are hereby incorporated by reference as if reproduced in their entirety.

FIELD OF THE INVENTION

The present invention relates to a process of forming a multi-layer pad of a non-woven fiber batt and a foam layer having conforming convoluted surfaces and to a multi-layer pad incorporating a non-woven fiber batt and foam layer.

BACKGROUND OF THE INVENTION

Mattresses and cushions for sofas, loveseats, chairs and other upholstery products generally comprise filler materials, batts, and foams, among other layering materials, for achieving a range of comfort, loft and durability. There are a number of advantages to be achieved by the construction of batts from synthetic, staple fiber material for use in mattresses and upholstery cushions. Such fibers are inherently lightweight and therefore easy to ship, store and manipulate during fabrication. These fibers are also generally less moisture absorbent than natural fibers such as cotton, or cellulosic based synthetic fibers such as rayon. Therefore, products made from these fibers can be maintained in a more hygienic condition and dried with much less expenditure of energy. When subjected to open flame, many of these fibers also tend to melt and drip rather than burn. While some of these fibers give off toxic fumes, the escape of such fumes has been avoided or minimized by encapsulating the batt in a fire retardant or relatively air impermeable casing. In contrast, fibers such as cotton burn rapidly at high heat and generate dense smoke.

Synthetic fiber batts have been used in mattresses and upholstery cushions since batts maintain their comfort characteristics over time. Traditional batts having desired comfort and height characteristics may generally be too stiff to allow a mattress or futon to be easily rolled for storage or folded into a sofa. As disclosed in U.S. Pat. No. 4,668,562, a batt would be required to create a mattress having the desired comfort characteristics.

Foam materials, in combination with fiber layers, have also been used in the construction of mattresses and upholstery cushions. As disclosed in U.S. Pat. No. 5,317,768, the entire disclosure of which is incorporated herein by reference, an upper surface positioned on top of the general coil structure of a mattress includes a first layer of cover or ticking, a second layer of fiber or filler material, a third layer of a foam having a convoluted surface which faces the second layer, and a fourth layer of backing material. All four layers are stitched together in a quilt pattern.

Futon furniture in recent years has become a popular alternative to standard upholstered furniture. Futon sofas, loveseats and chairs can be repositioned so that the furniture can be used as a bed. Traditionally, polyurethane foam has been combined with other types of cushioning materials such as cotton batting, latex rubber, and various man-made fiber products in order to impart the desired comfort characteristics to a final product. With time and use, the various types and combinations of materials take on different degrees of set as a result of compression from the weight of a human body. As is often the case with the softer materials, the final product will take more set over time with continued use. The more set the product takes over time, the more comfort, flexibility and height is lost from the product. It is desirable to bend, fold and/or roll up a futon mattress to be used as a sofa or for storage when the futon is not used as a flat sleep surface. Yet, when the futon is used as a sleep surface it must be stiff enough to span slats in a bed frame. Preferably, the material used in making the futon would take on little or no set.

As disclosed in U.S. patent application Ser. No. 09/363,726, now U.S. Pat. No. 6,500,292, entitled "Convoluted Surface Fiber Pad", having as co-inventor Steven Eugene Ogle (the same inventor here) and filed on Jul. 29, 1999, the entire disclosure of which is incorporated herein by reference, a non-woven fiber pad has a convoluted surface and an integral relatively thin but stiff base formed from a non-woven fiber batt. The ball is introduced between a pair of counter-rotating drums, at least one of which has a convoluted surface. As the fiber batt is drawn between the counter-rotating drums, the convolutions upon the surface of at least one roller compresses the surface of the non-woven batt in frictional engagement therewith to a greater or lesser degree depending on the degree of surface relief of the roller convolutions. A heated wire is placed generally parallel to and between the pair of drums so that as the non-woven batt is drawn between the drums and is compressed by the drum convolutions, the heated wire cuts through the non-woven batt creating a cut-pattern generally mirroring the convolutions on the surface of the drum compressing the non-woven batt. That is, where a drum convolution compresses the ball in the vicinity of the heated wire, the wire passes through the batt at a point nearer to the batt surface which is in contact with the drum convolution.

SUMMARY OF THE INVENTION

In accordance with the present invention, there is provided a novel process for forming a multi-layer pad of a non-woven fiber batt layer and a foam layer having conforming convoluted surfaces. The novel multi-layer pad has improved compression and loft maintenance which resists permanent set over time. Further, the pad of the present invention allows lower density foam and fiber to be used while achieving improved comfort, loft and compression characteristics.

The process of forming a non-woven fiber batt layer and a foam layer having conforming convoluted surfaces comprises transporting each layer along its longitudinal dimension while compressing each layer along its lateral dimension. Concomitantly with compression, each layer is cut transversely along its lateral dimension to separate each layer into an upper segment and a lower segment and to provide conforming convoluted surfaces between the segments of each layer.

In the preferred embodiment of the present invention, each of the non-woven fiber batt layer and the foam layer is transported by a conveyor belt to a first and a second pair of counter rotating drums, respectively, for compressing each layer. Further, at least one of each pair of drums has a convoluted surface having a raised pattern thereon. The pattern is generally a plurality of upstanding projections and depressions, and may include a plurality of pegs, straight edges or waved edges. As each layer is drawn between its pair of counter rotating drums, the convolutions on the drum surface compress the corresponding fiber or foam layer toward the opposite drum. A heated cutter is positioned generally parallel to and between each pair of drums for cutting each layer into an upper segment and a lower segment. Each heated cutter cuts through its corresponding layer material creating a cut pattern of upstanding projections and depressions which generally correspond to the convolutions on the surface of the drum compressing the layer. Further, because the cutter is heated, the fiber layer and the foam layer melt at their surfaces during the cutting operation and bond to adjacent fibers and foam cells, respectively, as their melted surfaces cools, creating a skin that retains the convoluted pattern.

The process of the present invention further comprises conforming the convoluted surface of the non-woven fiber batt layer with the convoluted surface of the foam layer. Preferably, the first pair of drums for compressing the non-woven fiber batt layer is aligned substantially above the second pair of drums for compressing the foam layer. Upon cutting the batt layer into upper and lower segments and convoluting their surfaces, the batt segments are conveyed in relatively opposite and substantially horizontal directions with their convoluted surfaces facing downward. Similarly cutting the foam layer into upper and lower segments and convoluting their surfaces, the foam segments are also conveyed in relatively opposite and substantially horizontal directions. However, the convoluted surfaces of the foam segments are facing upward. The downward facing batt segment convoluted surface is aligned with the upward facing foam segment convoluted surface so that the projections of the batt segment convoluted surface project into the corresponding depressions of the foam segment convoluted surface, while the projections of the foam segment convoluted surface project into the corresponding depressions of the batt segment convoluted surface.

BRIEF DESCRIPTION OF THE DRAWINGS

For a more complete understanding of the present invention, and for further details and advantages thereof, reference is now made to the following Detailed Description of the Invention taken in conjunction with the accompanying drawings, in which.

DETAILED DESCRIPTION OF THE INVENTION

Figure 1:
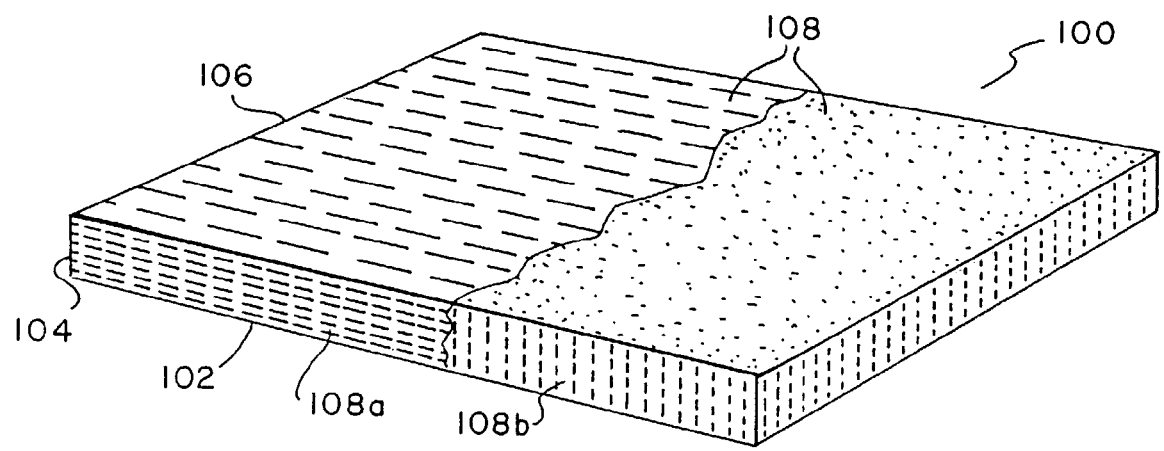
FIG. 1 provides a perspective view of a non-woven fiber batt layer.

REFERRING TO FIG. 1, a non-woven batt 100 has a longitudinal dimension 102, a lateral dimension 104 and a transverse dimension 106. The non-woven batt 100 may include a blend of different types of fibers 108 having varying diameters and deniers, and fibers which are hollow, solid and crimped. Blending different types of fibers 108 creates dead air spaces which contribute to the resiliency of the convoluted multi-layer pad 500 of the present invention (See FIGS. 3, 4 and 5) and lends to the integrity of the non-woven batt 100.

The fibers 108 of the non-woven batt 100 can be synthetic fibers which are known in the art, for example polyester and polypropylene. In an alternative embodiment, the fibers 108 are substantially synthetic fibers having a melting point in the range of about 189°–206°C. (300°–330°F.). In the preferred embodiment, the fibers 108 are polyester fibers having a melting point substantially in the above specified range. However, other synthetic fibers known in the art also may be used, such as polypropylene, having melt ranges close to or below the above-specified range. Additionally, natural fibers such as camel, llama, wool, cashmere, or cotton can be incorporated with synthetic fibers to form the non-woven batt 100. Because natural fibers may tend to generate smoke when in contact with a heated cutter, the percentage of natural fiber incorporated into the non-woven batt 100 should be within a range which will not create an environmental or health hazard during a heated cutting operation.

The fibers 108 of the non-woven batt 100 can also be densified. Densified fibers as used herein refers to fibers having a weight to thickness ratio of at least 57 grams (2 ounces) per 3.8 centimeter (1.5 inch) thickness for a 30.5 square centimeter (1 square foot) area of batt.

The fibers 108 can be oriented substantially horizontally 108a along the longitudinal dimension 102 and traverse dimension 106 of the non-woven batt 100. In an alternative embodiment, the non-woven batt 100 can be comprised of horizontally oriented fibers 108a, and vertically oriented fibers 108b along the lateral dimension 104 of the non-woven batt 100. In the preferred embodiment, the non-woven batt 100 is formed from substantially vertically oriented fibers 108b, as vertically oriented fibers 108b have better convolution retention properties as compared to horizontally oriented fibers 108a, as discussed below.

The batt 100 can be formed using one of the several processes for converting a source of fiber into a non-woven batt 100, as is known in the art. The fibers 108 may receive an application of a resin to improve the structural integrity of the non-woven batt 100, or alternatively may incorporate a portion of low melting fibers which will melt to bond high melt fibers in the non-woven batt 100 on application of heat. The ends of the fibers 108 in non-woven batt 100 may be brushed to improve the entwining of individual fibers of one end into adjacent ends. Adjacent ends of fibers 108 may be of substantially the same height, or alternatively may have different heights in a repeating pattern. The structure and manufacture of a batt incorporating vertically oriented fibers is described in more detail in U.S. Pat. No. 5,702,801, the entire disclosure of which is incorporated herein by reference.

In the early stages of forming the non-woven batt 100 from the fibers 108, the non-woven batt 100 may have an initial thickness of up to about eighteen (18) inches. The fibers 108 are spray bonded together with an adhesive and then compressed by rolling the fibers 108 to form the non-woven batt 100, as is known in the art. In an alternative process, the fibers 108 are oven-baked together and then rolled and cooled to form the non-woven batt 100.

Figure 2:
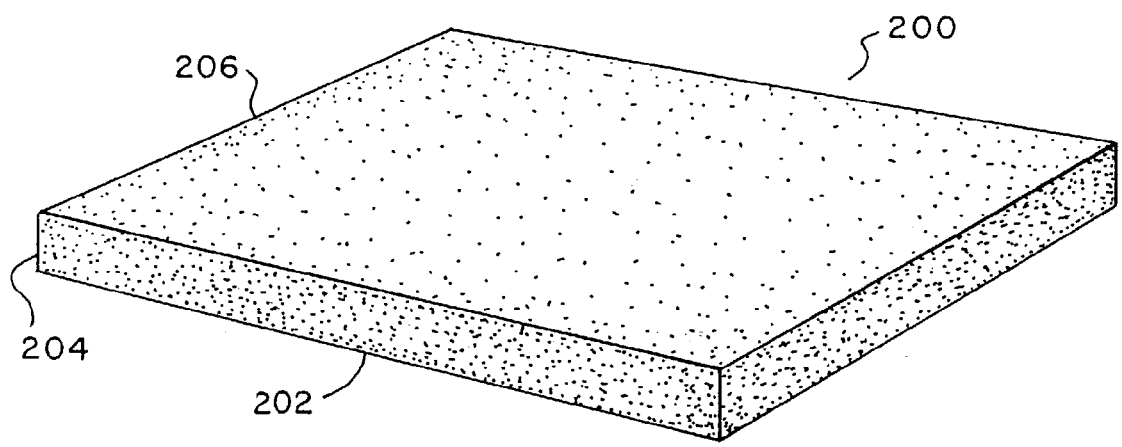
FIG. 2 provides a perspective view of a foam layer.

REFERRING TO FIG. 2, a foam layer 200 has a longitudinal dimension 202, a lateral dimension 204 and a transverse dimension 206. The foam layer 200 preferably is a cellular foam structure which is resilient along its dimensions 202, 204, 206. The foam layer 200 compresses when weight or a load is placed along its dimensions 202, 204, 206 and returns generally to its original state when the weight or load is removed. The structure of a foam layer having a convoluted surface is described in U.S. Pat. No. 5,317,768, the entire disclosure of which is incorporated herein by reference.

The lateral dimension 204 of the foam layer 200 can be as large or as small as desired. In an alternative embodiment, the lateral dimension 204 is in the range of one half to three (½–3) inches. In another alternative embodiment, the lateral dimension 204 is in the range of one to one and one half (1–1½) inches. In the preferred embodiment, the lateral dimension 204 of the foam layer 200 is approximately 1¼ inches.

Figure 3:
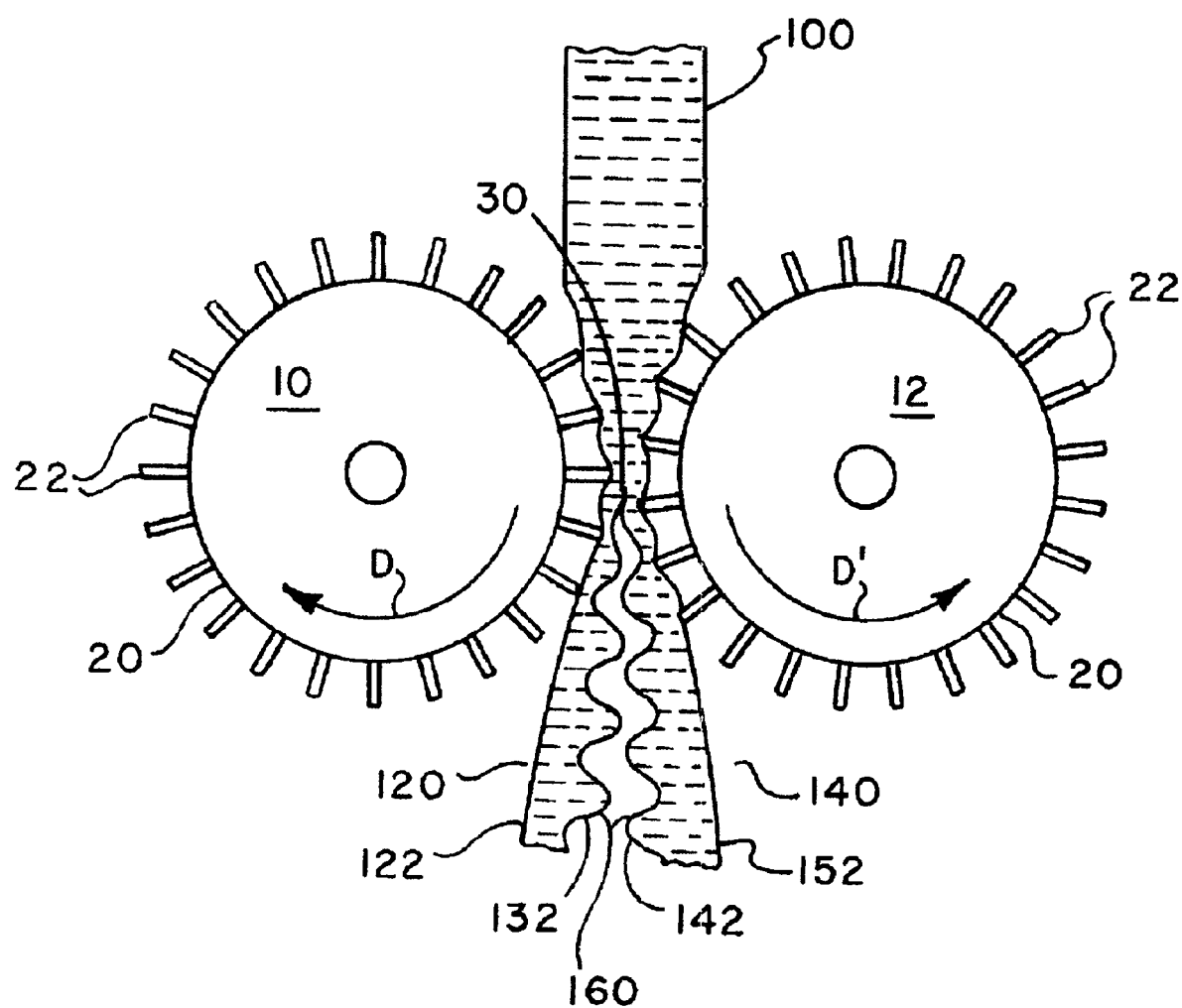
FIG. 3 provides a schematic drawing of a process of the present invention.

REFERRING TO FIG. 3, the process of forming non-woven batt 100 having convoluted surface 160 is generally accomplished by transporting the non-woven ban 100 along its longitudinal dimension 102 while compressing the non-woven batt 100 along its lateral dimension 104. Concomitantly with compression, the non-woven ball 100 is cut transversly along its lateral dimension 104 to separate the non-woven batt 100 into an upper segment 120 and a lower segment 140 and to provide conforming convoluted surface 160 of the ball upper and lower segments 120, 140. The batt upper and lower segments 120, 140 each have an upper surface 122, 142 and a lower surface 132, 152, respectively. The convoluted surface 160 of the batt upper segment 120 is proximate to its lower surface 132. Conversely, the convoluted surface 160 of the batt lower segment 140 is proximate to its upper surface 142. A process for forming a non-woven fiber pad having a convoluted surface is disclosed, for example, in the aforementioned in U.S. patent application Ser. No. 09/363,726, now U.S. Pat. No. 6,500,292, entitled "Convoluted Surface Fiber Pad", having as co-inventor Steven Eugene Ogle (the same inventor here) and filed on Jul. 29, 1999, the entire disclosure of which is incorporated herein by reference.

Figure 4:
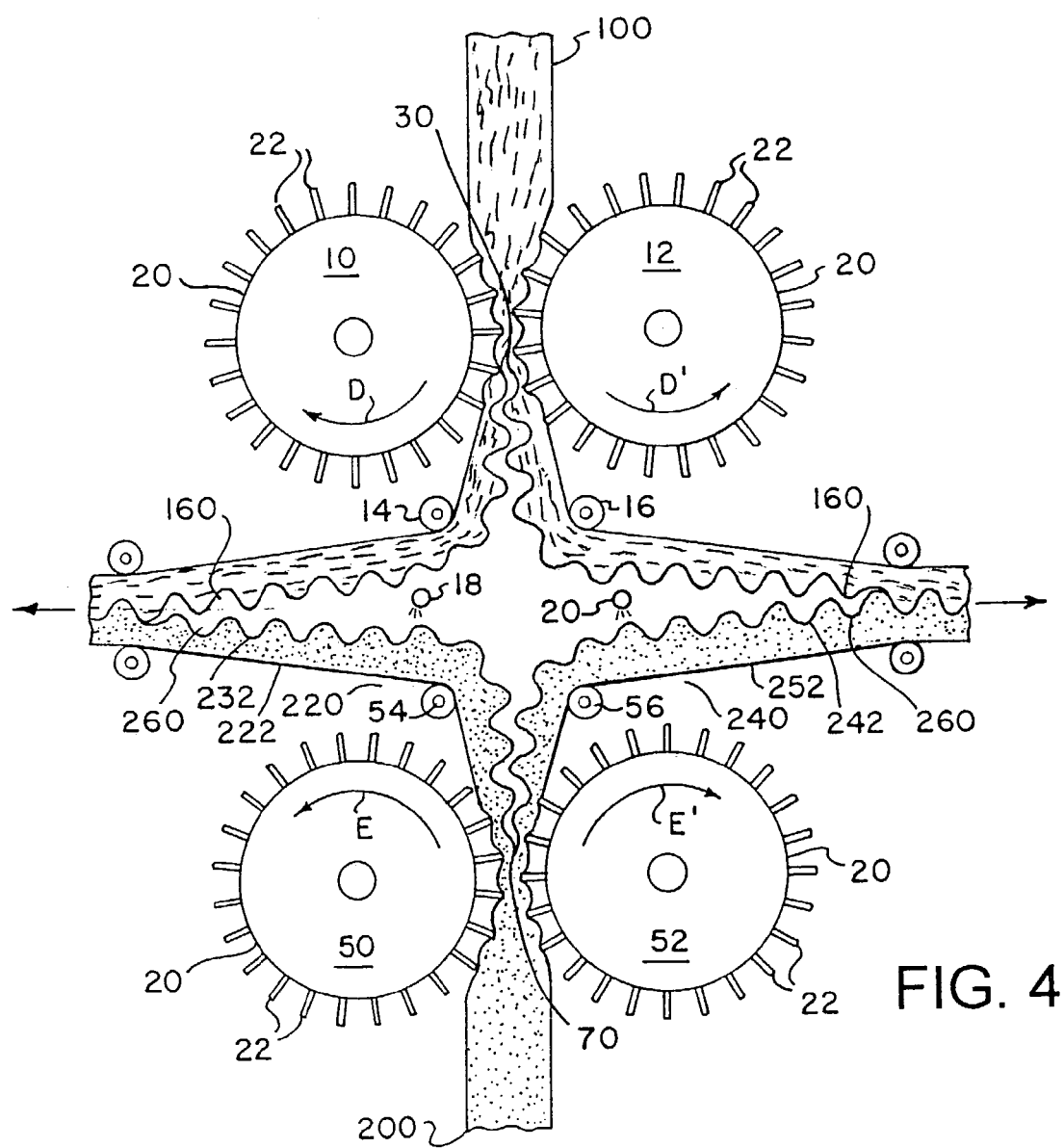
FIG. 4 provides a schematic drawing of an alternative embodiment of a process of the present invention.

REFERRING TO FIG. 4, similar to the general process of forming non-woven batt 100 having a convoluted surface 160, the process of forming foam layer 200 having a convoluted surface 260 is generally accomplished by transporting the foam layer 200 along its longitudinal dimension 202 while compressing the foam layer 200 along its lateral dimension 204. Concomitantly with compression, the foam layer 200 is cut transversly along its lateral dimension 204 to separate the foam layer 200 into an upper segment 220 and a lower segment 240 and to provide conforming convoluted surface 260 of the foam layer upper and lower segments 220, 240, respectively. The foam layer upper and lower segments 220, 240 each have an upper surface 222, 242 and a lower surface 232, 252, respectively. The convoluted surface 260 of the foam layer upper segment 220 is proximate to its lower surface 232. Conversely, the convoluted surface 260 of the foam layer lower segment 240 is proximate to its upper surface 242.

Figure 5:
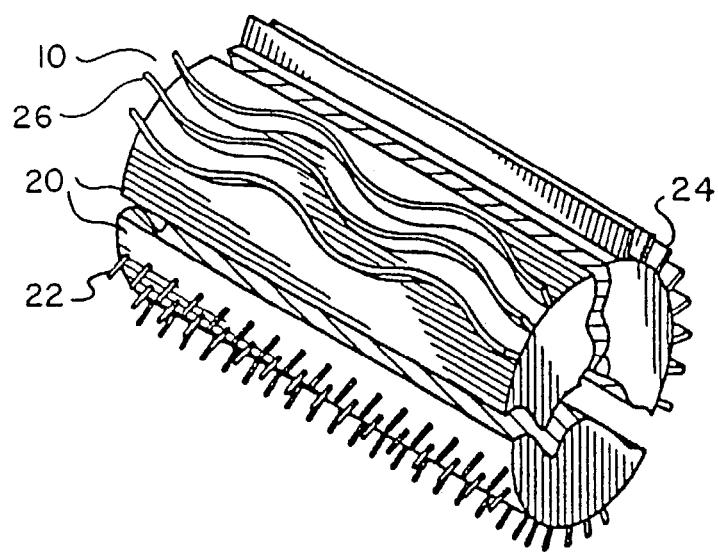
FIG. 5 provides a perspective view of a drum having alternative embodiments of convoluted surfaces thereon.

REFERRING TO FIGS. 3 and 5, the preferred embodiment for transporting the non-woven batt 100 along its longitudinal dimension 102 is accomplished by a conveyor belt (not shown), although it is to be understood that alternate embodiments are known in the art. Compression of the non-woven batt 100 along its lateral dimension 104 is preferably accomplished by a pair of drums 10, 12 having opposite rotational directions D, D'. As the conveyor belt introduces the non-woven batt 100 between the drums 10, 12, the drums 10, 12 draw the non-woven batt 100 to compression.

Drums 10, 12 each have a convoluted surface 20 with at least one raised pattern thereon. The raised pattern is generally a plurality of upstanding projections and depressions. Alternative embodiments of the raised pattern include a plurality of pegs 22, straight edges 24 or waved edges 26, although it is to be understood that alternative raised patterns are known in the art. The convoluted surface 20 of drum 10 should not intermesh or come in contact with the convoluted surface 20 of opposite drum 12 as the drums 10, 12 rotate. In an alternative embodiment, only one of the drums 10,12 has a convoluted surface 20 while the other of the drums 10, 12 does not have a convoluted surface 20 which operates to facilitate the drawing of the batt 100 through the drums 10, 12.

As the non-woven batt 100 is drawn into frictional engagement with drum 10 and drum 12, the convoluted surface 20 of either of drum 10 or drum 12 compresses the non-woven batt 100 along its lateral dimension 104 towards the opposite drum 12, 10, respectively. A cutting device 30, schematically shown as an X, is positioned generally parallel to and between drum 10 and drum 12, and along the lateral dimension 104 of non-woven batt 100 as the non-woven batt 100 is transported between the drums 10, 12. In the preferred embodiment, the cutting device 30 is positioned proximate the location along the longitudinal dimension 102 of the non-woven batt 100 generally where the convoluted surface 20 of drum 10 or drum ,12 compresses the non-woven batt 100.

As the non-woven batt 100 encounters the cutting device 30, the cutting device 30 cuts through the non-woven batt 100 transversely and along the lateral dimension 104 to separate non-woven batt 100 into an upper segment 120 and a lower segment 140, each segment 120, 140 having an upper surface 122, 142 and a lower surface 132, 152, respectively. The cutting device 30 cuts through the non-woven batt 100 at a point along its lateral dimension 104 either nearer to the upper surface 122 of the batt upper segment 120 or to the lower surface 152 of the batt lower segment 140, whichever surface 122 or 152 is in contact with the convoluted surface 20, thus creating convoluted surface 160 of non-woven batt 100.

REFERRING BACK TO FIG. 4, the preferred embodiment for convoluting the foam layer 200 is similar to the process for convoluting the non-woven batt 100. Transportation of the foam layer 200 along its longitudinal dimension 202 is accomplished with a conveyor belt (not shown), although it is to be understood that alternate embodiments are known in the art. Compression of the foam layer 202 along its lateral dimension 204 is preferably accomplished by a pair of drums 50, 52 having opposite rotational directions E, E'. As the conveyor belt introduces the foam layer 200 between drums 50, 52, the drums 50, 52 draw the foam layer 200 to compression. Drums 50, 52 each have a convoluted surface 20 with at least one raised pattern thereon which corresponds to the raised pattern of drums 10, 12. The convoluted surface 20 of drum 50 should not intermesh or come in contact with the convoluted surface 20 of opposite drum 52 as the drums 50, 52 rotate. In an alternative embodiment, only one of the drums 50,52 has a convoluted surface 20 while the other of the drums 50, 52 does not have a convoluted surface 20 which operates to facilitate the drawing of the foam layer 200 through the drums 50, 52.

As the foam layer 200 is drawn into frictional engagement with drum 50 and drum 52, the convoluted surface 20 of either drum 50 or drum 52 compresses the foam layer 200 along its lateral dimension 204 towards the opposite drum 52, 50, respectively. A cutting device 70, schematically shown as an Y, is positioned generally parallel to and between drum 50 and drum 52, and along the lateral dimension 204 of foam layer 200 as the foam layer 200 is transported between the drums 50, 52. In the preferred embodiment, the cutting device 70 is positioned proximate the location along the longitudinal dimension 202 of foam layer 200 where the convoluted surface 20 of drums 50,52 compresses the foam layer 200. As the foam layer 200 encounters the cutting device 70, the cutting device 70 cuts through the foam layer 200 transversely and along the lateral dimension 204 to separate foam layer 200 into an upper segment 220 and a lower segment 240, each segment 220, 240 having an upper surface 222, 242 and a lower surface 232, 252, respectively. The cutting device 70 cuts through the foam layer 200 at a point along its lateral dimension 204 either nearer to the upper surface 222 of the foam layer upper segment 220 or to the lower surface 252 of the foam layer lower segment 240, whichever upper 222 or 252 is in contact with the convoluted surface 20.

It will be understood by those in the art that the drums 10, 12 may be positioned closer to or further away from each other depending on lateral dimension 104 of the non-woven batt 100 to be convoluted. Similarly, the distance between drums 50, 52 may be positioned depending on the lateral dimension 204 of the foam layer 200 to be convoluted. In the preferred embodiment, the convoluted surface 20 of drum 10 does not come into contact with or intermesh with the convoluted surface 20 of drum 12 to prevent the cutting device 30 from cutting through the upper surface 122 of the batt upper segment 120 or the lower surface 152 of the batt lower segment 140. Similarly, in the process for convoluting the foam layer 200, the convoluted surface 20 of drum 50 does not come into contact with or intermesh with the convoluted surface 20 of drum 52 to prevent the cutting device 70 from cutting through the upper surface 222 of the foam upper segment 220 or the lower surface 252 of the foam lower segment 240.

The cutting devices 30, 70 can be heated cutters. In the preferred embodiment, cutting devices 30, 70 are hot wires. The heated cutters of cutting devices 30 and 70 can be heated above the melting point of the fibers 108 of the non-woven batt 100 and of the foam 200, respectively, in order to speed the cutting process. For polyester fibers of the non-woven batt 100, the cutting device 30 should be heated in the range of about 189°–206° C. (300°–330° F.). For non-woven batt 100 formed from synthetic fibers 108 having a low melting point, as the heated cutter 30 cuts through the non-woven batt 100, the lower surface 132 of the batt upper segment 120 and the upper surface 142 of the batt lower segment 140 are bonded as fibers 108 lose their original plastic memory and then reform as a skin during cooling.

Figure 6:
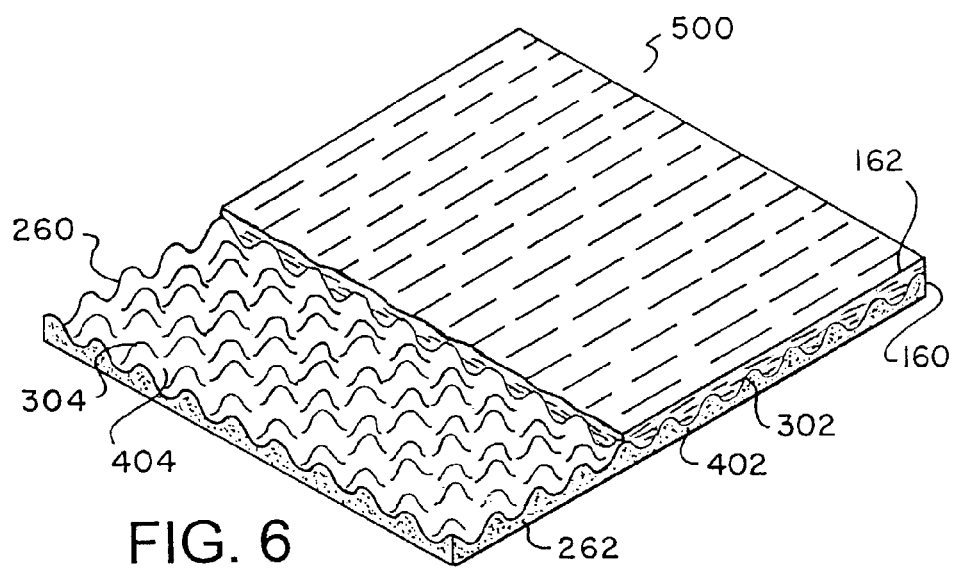
FIG. 6 provides a perspective sectional view of a multi-layer pad of a non-woven fiber batt and a foam having conforming convoluted surfaces.
Figure 7:
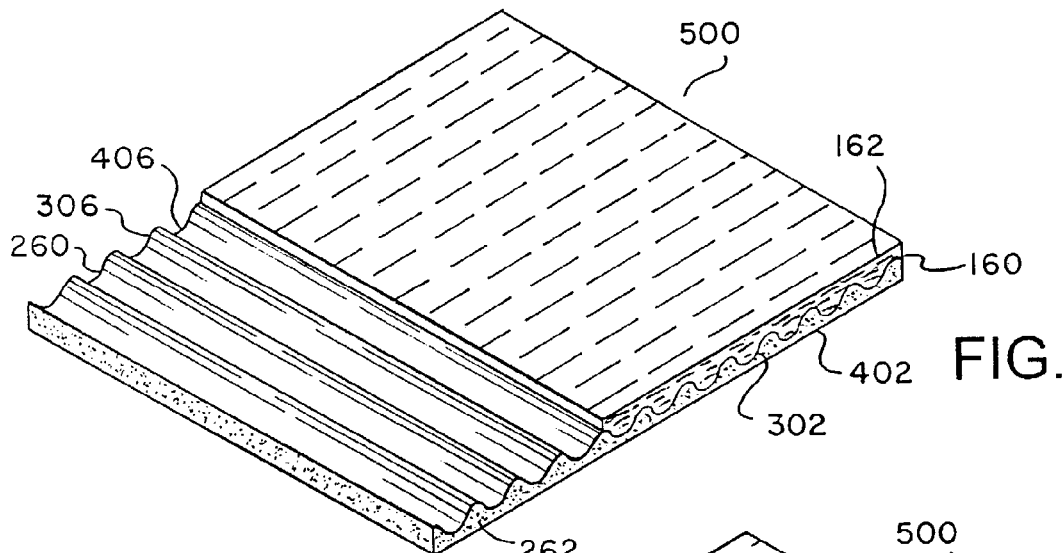
FIG. 7 provides a perspective sectional view of an alternative embodiment of a multi-layer pad of non-woven fiber batt and a foam having conforming convoluted surfaces.
Figure 8:
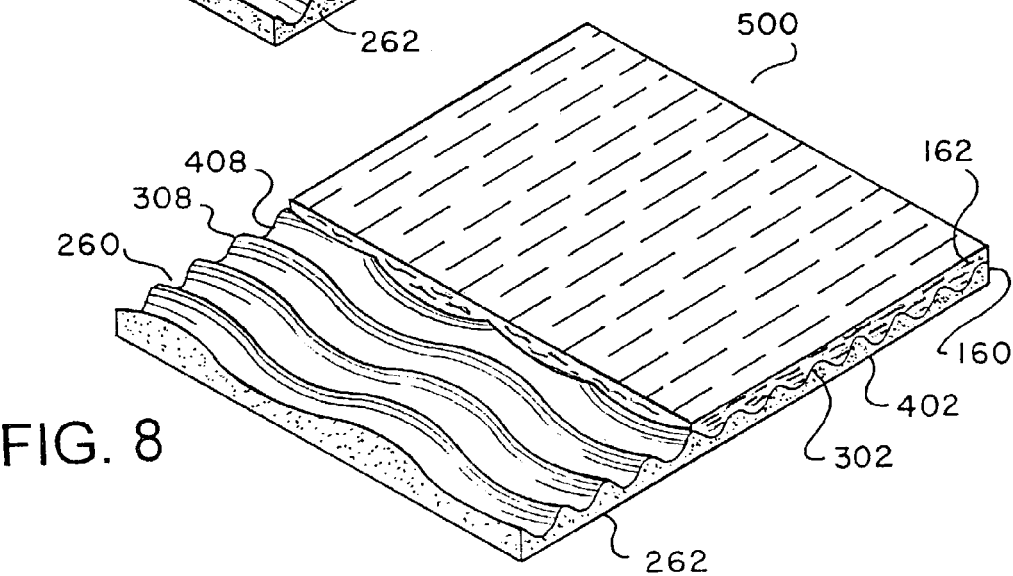
FIG. 8 provides a perspective sectional view of another alternative embodiment of a multi-layer pad of a non-woven fiber batt and a foam having conforming convoluted surfaces.

REFERRING TO FIGS. 6, 7, and 8, convoluted surfaces 160, 260 of the non-woven batt 100 and foam layer 200, respectively, are generally comprised of projections 302 and depressions 402 having different patterns and configurations depending upon the convoluted surface 20 of the drums 10, 12, 50, 52. For example, a plurality of pegs 22 of drum convoluted surface 20 forms a plurality of peaks 304 and basins 404 on convoluted surfaces 160, 260 of non-woven batt 100 and foam layer 200. A plurality of straight edges 24 on the drum convoluted surface 20 forms ridges 306 and valleys 406 on convoluted surfaces 160, 260 of the non-woven fiber batt 100 and the foam layer 200. Waved ridges 308 and waved valleys 408 on convoluted surfaces 160, 260 of the fiber batt 100 and foam layer 200 are formed of waved ridges on the convoluted surface 20 of the drum.

REFERRING BACK TO FIG. 8, generally the process for forming a convoluted combination fiber and foam pad includes disposing the convoluted surface 160 of at least one of the batt upper and lower segments 120, 140 in a conforming relationship to the convoluted surface 260 of at least one of the foam layer upper and lower segments 220, 240 to form a multi-layer pad of a non-woven fiber batt and foam layer having conforming convoluted surfaces. The cohesive nature of the non-woven batt 100 and the foam layer 200 would provide sufficient bonding in some applications. In alternative embodiments, the conforming convoluted surfaces 160, 260, of the batt 100 and fiber 200, respectively, could be bonded using various bonding agents known in the art.

The preferred embodiment for forming a multi-layer pad of a non-woven batt and foam layer having conforming convoluted surfaces is accomplished by aligning the pair of drums 10, 12 substantially above the pair of drums 50, 52 and convoluting the non-woven batt 100 and the foam layer 200, respectively, as discussed above. The raised pattern of convoluted surface 20 of drums 50, 52 corresponds to the raised pattern of convoluted surface 20 of drums 10, 12. Upon cutting and convoluting non-woven batt 100, the upper and lower segments 120, 140 of the non-woven batt 100 are transported in relatively opposite and substantially horizontal directions, the lower surface 132 of the batt upper segment 120 facing relatively downward and the upper surface 142 of the batt lower segment 140 facing relatively downward. Thus, the convoluted surface 160 of the batt upper and lower segments 120, 140 is facing relatively downward. In an alternative embodiment, a pair of counter rotating rollers 14, 16 located generally below drums 10, 12 assist in transporting the segments 120, 140 of the non-woven batt 100 in relatively opposite and substantially horizontal directions. In another alternative embodiment, a conveyor belt (not shown) proximate the surfaces opposite the convoluted surface 160 further assists in transporting the segments 120, 140 of the non-woven batt 100 in opposite and horizontal directions.

Similarly, upon convolution of the foam layer 200 as detailed above, the upper and lower segments 220, 240 of the foam layer 200 are transported in relatively opposite and substantially horizontal directions, the lower surface 232 of the foam layer upper segment 220 facing relatively upward and the upper surface 242 of the foam layer lower segment 140 also facing relatively upward, and the convoluted surface 260 of the foam layer upper and lower segments 220, 240 facing relatively upward. In an alternative embodiment, a pair of counter rotating rollers 54, 56 located generally above drums 50, 52 assist in transporting the segments 220, 240 of the foam layer 200 in opposite and substantially horizontal directions. In another alternative embodiment, a conveyor belt (not shown) proximate the surfaces opposite the convoluted surface 260 further assists in transporting the segments 220, 240 of the foam layer 200 in opposite and horizontal directions.

As the segments 120, 140 of the non-woven batt 100, and the segments 220, 240 of the foam layer 200, are transported in opposite and generally horizontal directions, the batt upper segment 120 and the foam upper segment 220 come together laterally. Similarly, the batt lower segment 140 and the foam lower segment 240 laterally come together. In an alternative embodiment, the distance between conveyor belts (not shown) proximate the non-convoluted surfaces of the non-woven batt 100 and foam layer 200 are adjusted to accomplish the lateral movement. The batt convoluted surface 160 and the foam layer convoluted surface 260 are aligned to provide the upstanding projections 302 of the batt convoluted surface 160 to conform with or project into the depressions 402 of the foam convoluted surface 260, and the depressions 402 of the batt convoluted surface 160 to conform with or project into the upstanding projections 302 of the foam convoluted surface 260. In the preferred embodiment, alignment of the convoluted surfaces 160, 260 is accomplished by controlling the rotational speeds of drums 10, 12 and of drums 50, 52, and adjusting the horizontal placement of the convoluted surfaces 160, 260 for proper alignment. In an alternative embodiment as shown in FIG. 3, the peaks 304 of the batt and foam convoluted surfaces 160, 260, conform with or project into the corresponding basins 404 of the convoluted surfaces 260, 160 of the batt and foam, respectively. In another alternative embodiment shown in FIG. 4, the ridges 306 of the batt convoluted surface 160 and the foam convoluted surface 260 conform with or project into the corresponding valleys 406 of the foam convoluted surface 260 and the batt convoluted surface 160, respectively. In a further alternative embodiment shown in FIG. 5, the waved ridges 308 of the batt and foam convoluted surfaces 160, 260 conform with or project into the corresponding waved valleys 408 of foam and batt convoluted surfaces 260, 160, respectively.

The convoluted surfaces 160, 260 of the batt 100 and foam layer 200 can be bonded together with a bonding agent. The bonding agent can be applied in various manners and stages throughout the process as is known in the art. In a preferred embodiment, an apparatus 18, 20 sprays a bonding agent on at least one of the convoluted surfaces 160, 260 proximate rollers 14, 16 or rollers 54, 56.

REFERRING TO FIGS. 6, 7, 8, the multi-layer pad of a non-woven batt and a foam layer having conforming convoluted surfaces is for use in mattresses and cushions for sofas, loveseats, chairs and other upholstery products. The multi-layer pad 500 has convoluted surfaces 160, 260 generally comprised of projections 302 and depressions 402 in different patterns and configurations depending upon the convoluted surface 20 of the drums 10, 12, and 50, 52. The convoluted surfaces 160, 260 remain integral with unconvoluted thin bases 162, 262 of the non-woven batt 100 and the foam layer 200, respectively, to retain stiffness for using the multi-layer pad 500 in items such as sofas, cushions and mattresses. For example, convoluted surface 160 and base 162 are formed from the same non-woven batt 100 and convoluted surface 260 and base 262 are formed from the same foam layer 200. The non-woven batt component 100 of the multi-layer pad 500 may be made of either substantially vertically oriented low melt fibers 108*b* or substantially horizontally oriented densified low melt fibers 108*b*. When the non-woven batt component 100 of the multi-layer pad 500 is made from vertically oriented fibers 108*b*, the projections 302 of convoluted surface 160 have a greater ability to retain their shape when cut by the heated cutter 30, as the vertical orientation of fibers 108*b* resists sloughing off portions of the projections 302 during the convolution process.

What is claimed is:

1. A multi-layer pad, comprising:
a foam layer having a pre-formed convoluted surface; and
a fiber layer having a pre-formed convoluted surface, said fiber layer comprised of a fiber batt having a convoluted shape and comprised of a plurality of fibers which are: (1) substantially vertically oriented between a generally flat surface of said fiber batt and a convoluted surface of said fiber batt and (2) substantially vertically oriented relative to said multi-layer pad;
said pre-formed convoluted surface of said foam layer bonded to said pre-formed convoluted surface of said fiber layer.

2. The multi-layer pad of claim 1, wherein said pre-formed convoluted surface of said fiber layer is configured to include a plurality of upstanding projections and a plurality of depressions.

3. The multi-layer pad of claim 2, wherein said pre-formed convoluted surface of said foam layer is configured to include a plurality of upstanding projections and a plurality of depressions and wherein at least one of said plurality of upstanding projections of said pre-formed convoluted surface of said foam layer projects into a corresponding one or ones of said plurality of depressions of said pre-formed convoluted surface of said fiber layer and at least one of said plurality of upstanding projections of said pre-formed convoluted surface of said fiber layer projects into a corresponding one or ones of said plurality of depressions of said pre-formed convoluted surface of said foam layer.

4. The multi-layer pad of claim 2, wherein said pre-formed convoluted surface of said foam layer is configured to include a plurality of upstanding projections and a plurality of depressions and wherein said foam layer is bonded to said fiber layer such that said pre-formed convoluted surface of said foam layer conforms to said pre-formed convoluted surface of said fiber layer.

5. The multi-layer pad of claim 1, wherein said fibers which: (1) are substantially vertically oriented between said generally flat surface of said fiber batt and said convoluted surface of said fiber batt (2) are substantially vertically oriented relative to said multi-layer pad (3) provide said fiber layer having said pre-formed convoluted surface with an enhanced convolution retention property which enables said fiber layer having said pre-formed convoluted surface to retain its shape in the absence of external forces.

6. The multi-layer pad of claim 1, wherein said fiber batt further comprises an unconvoluted base and a plurality of projections integrally formed with said unconvoluted base, each one of said plurality of projections having a free-standing peak spaced apart from said free-standing peaks of adjacent ones of said plurality of projections.

7. The multi-layer pad of claim 6, wherein said pre-formed convoluted surface of said foam layer is configured to include a plurality of upstanding projections and a plurality of depressions, said plurality of upstanding projections of said foam layer being inserted in between said free-standing peaks of said fiber batt when bonding said foam layer to said fiber layer.

8. The multi-layer pad of claim 6 wherein said fiber batt has a lateral dimension which extends between said generally flat and convoluted surfaces thereof and wherein said plurality of fibers which are: (1) substantially vertically oriented between said generally flat and convoluted surfaces of said fiber batt (2) substantially vertically oriented relative to said multi-layer pad (3) oriented along said lateral dimension of said fiber batt, and (4) generally parallel to said plurality of projections.

9. A multi-layer pad, comprising:
a foam layer having a convoluted surface; and
a fiber layer having a convoluted surface;
said convoluted surface of said foam layer bonded to said convoluted surface of said fiber layer;

said foam layer being pre-formed, prior to bonding with said fiber layer, to have said convoluted surface;

said fiber layer being pre-formed, prior to bonding with said foam layer, to have said convoluted surface; and said fiber layer having a convoluted surface comprised of a fiber batt having a plurality of fibers which: (1) are substantially vertically oriented between a generally flat, lower side surface of said fiber batt and a convoluted upper side surface of said fiber batt, (2) are substantially vertically oriented relative to said multi-layer pad and (3) enable said convoluted upper side surface of said fiber batt to better retain a convoluted pattern in the absence of external forces.

10. The multi-layer pad of claim 9, wherein said pre-formed convoluted surface of said fiber layer includes a plurality of upstanding projections and a plurality of depressions.

11. The multi-layer pad of claim 10, wherein said fiber batt has a lateral dimension which extends between said generally flat, lower side and convoluted upper side surfaces thereof and wherein said plurality of fibers which: (1) are substantially vertically oriented between said generally flat, lower and convoluted upper side surfaces of said fiber batt, (2) are substantially vertically oriented relative to said multi-layer pad and (3) enable said convoluted upper side surface of said fiber batt to better retain said convoluted patter in the absence of external forces also (4) are oriented along said lateral dimension of said fiber batt and (5) are generally parallel to said plurality of projections.

12. The multi-layer pad of claim 9, wherein said pre-formed convoluted surface of said foam layer includes a plurality of upstanding projections and a plurality of depressions and wherein said pre-formed convoluted surface of said fiber layer includes a plurality of upstanding projections and a plurality of depressions.

13. The multi-layer pad of claim 12, wherein at least one of said plurality of upstanding projections of said pre-formed convoluted surface of said foam layer projects into a corresponding one or ones of said plurality of depressions of said pre-formed convoluted surface of said fiber layer and at least one of said plurality of upstanding projections of said pre-formed convoluted surface of said fiber layer projects into a corresponding one or ones of said plurality of depressions of said pre-formed convoluted surface of said foam layer.

14. The multi-layer pad of claim 12, wherein said foam layer is bonded to said fiber layer such that said pre-formed convoluted surface of said foam layer conforms to said pre-formed convoluted surface of said fiber layer.

15. The multi-layer pad of claim 9, wherein said fiber batt further comprises an unconvoluted base and a plurality of projections integrally formed with said unconvoluted base, each one of said plurality of projections having a free-standing peak spaced apart from said free-standing peaks of adjacent ones of said plurality of projections.

16. The multi-layer pad of claim 15, wherein said pre-formed convoluted surface of said foam layer is configured to include a plurality of upstanding projections and a plurality of depressions, said plurality of upstanding projections of said foam layer being inserted in between said free-standing peaks of said fiber batt when bonding said foam layer to said fiber layer.

17. The multi-layer pad of claim 9, wherein said fiber batt has a lateral dimension which extends between said generally flat, lower side and convoluted upper side surfaces thereof and wherein said plurality of fibers which: (1) are substantially vertically oriented between said generally flat, lower side and convoluted upper side surfaces of said fiber batt, (2) are substantially vertically oriented relative to said multi-pad layer and (3) enable said convoluted upper side surface of said fiber batt to better retain said convoluted pattern in the absence of external forces also (4) are oriented along said lateral dimension of said fiber batt.

18. A multi-layer pad, comprising:

a foam layer having a first, generally flat, surface and a second, convoluted, surface; and a fiber layer, said fiber layer comprised of a fiber batt having a lateral dimension extending between a first, generally flat, bottom side surface and a second, convoluted, top side surface, said fiber batt comprised of a plurality of fibers substantially vertically oriented between said first, generally flat, bottom side surface of said fiber batt and said second, convoluted, top side surface of said fiber batt, said plurality of substantially vertically oriented fibers enabling said fiber batt to maintain said convoluted shape of said second surface in the absence of external forces and prior to engagement of said second surface of said foam layer with said second surface of said fiber batt.

19. The multi-layer pad of claim 18, wherein said plurality of fibers substantially vertically oriented between said first, generally flat, bottom side surface of said fiber batt and said second, convoluted, top side surface of said fiber batt are also: (1) substantially vertically oriented along said lateral dimension of said fiber batt, and (2) substantially vertically oriented relative to said multi-layer pad.

20. The multi-layer pad of claim 18, wherein said fiber batt further comprises an unconvoluted base and a plurality of projections integrally formed with said unconvoluted base, each one of said plurality of projections having a free-standing peak spaced apart from said free-standing peaks of adjacent ones of said plurality of projections.

21. The multi-layer pad of claim 20, wherein said plurality of fibers substantially vertically oriented between said first, generally flat, bottom side surface of said fiber batt and said second, convoluted, top side surface of said fiber batt are also: (1) substantially vertically oriented along said lateral dimension of said fiber batt, and (2) generally parallel to said plurality of projections.

22. A multi-layer pad, comprising:

a nonwoven fiber batt having a front surface, a back surface, a top surface, a bottom surface, a first side surface and a second side surface; and a foam layer having a bottom surface;

said bottom surface of said foam layer engaged with said top surface of said nonwoven fiber batt;

said bottom surface of said nonwoven fiber batt having a generally flat shape and said top surface of said nonwoven fiber batt having a convoluted shape;

said nonwoven fiber batt having a longitudinal dimension extending between said first side surface and said second side surface, a lateral dimension extending between said bottom surface and said top surface and a transverse dimension extending between said front surface and said back surface;

said nonwoven fiber batt comprised of fibers which are: substantially vertically oriented along said lateral dimension of said nonwoven fiber batt.

23. The multi-layer pad of claim 22, wherein said nonwoven fiber batt further comprises an unconvoluted base and a plurality of projections integrally formed with said unconvoluted base, each one of said plurality of projections having a free-standing peak spaced apart from said free-standing peaks of adjacent ones of said plurality of projections.

24. The multi-layer pad of claim 22, wherein said nonwoven fiber batt is densified.

25. The multi-layer pad of claim 22, wherein said nonwoven fiber batt is comprised of a plurality of fibers spray-bonded to one another by an adhesive and wherein formation of said convoluted top surface does not weaken the bonds between said plurality of fibers substantially vertically oriented between said generally flat bottom surface and said convoluted top surface.

26. The multi-layer pad of claim 22, wherein said nonwoven fiber batt is comprised of a first plurality of high-melt fibers and a second plurality of low-melt fibers bonded to one another and to said first plurality of high melt fibers and wherein formation of said convoluted top surface does not weaken the bonds between said first and second plurality of fibers.

27. The multi-layer pad of claim 22, wherein said plurality of fibers substantially vertically oriented along said lateral dimension of said fiber batt are also substantially vertically oriented relative to said multi-layer pad.

* * * * *

UNITED STATES PATENT AND TRADEMARK OFFICE
CERTIFICATE OF CORRECTION

| | | |
|---|---|---|
| PATENT NO. | : 7,008,691 B2 | Page 1 of 1 |
| APPLICATION NO. | : 10/445706 | |
| DATED | : March 7, 2006 | |
| INVENTOR(S) | : Steven Eugene Ogle | |

It is certified that error appears in the above-identified patent and that said Letters Patent is hereby corrected as shown below:

Col. 5, line 22, replace "ban" with -- batt --

Col. 5, line 25, replace "ball" with -- batt --

Col. 5, line 29, replace "ball" with -- batt --

Signed and Sealed this

Twenty-eighth Day of November, 2006

JON W. DUDAS
*Director of the United States Patent and Trademark Office*